US012269713B2

(12) United States Patent
Homewood

(10) Patent No.: US 12,269,713 B2
(45) Date of Patent: Apr. 8, 2025

(54) LIFTING CLAMP

(71) Applicant: Kenneth Brandon Homewood, Norwich (CA)

(72) Inventor: Kenneth Brandon Homewood, Norwich (CA)

( * ) Notice: Subject to any disclaimer, the term of this patent is extended or adjusted under 35 U.S.C. 154(b) by 789 days.

(21) Appl. No.: 17/547,926

(22) Filed: Dec. 10, 2021

(65) Prior Publication Data

US 2022/0194748 A1 Jun. 23, 2022

Related U.S. Application Data

(60) Provisional application No. 63/128,271, filed on Dec. 21, 2020.

(51) Int. Cl.
*B66C 1/44* (2006.01)

(52) U.S. Cl.
CPC .................................... *B66C 1/442* (2013.01)

(58) Field of Classification Search
CPC .............. B66C 1/442; B66C 1/42; B66C 1/66
USPC .................................... 294/118, 110.1, 110.2
See application file for complete search history.

(56) References Cited

U.S. PATENT DOCUMENTS 1,516,031 A * 11/1924 Venable .................. B66C 1/422 294/110.1
2,286,071 A * 6/1942 Dragan ................... B66C 1/422 294/119
2,337,177 A 12/1943 Jack
3,561,812 A * 2/1971 Dixon ...................... B66C 1/442 294/110.1
3,674,302 A * 7/1972 Mutch ..................... B66C 17/12 294/111
3,697,118 A * 10/1972 Johnstone ............... B66C 1/422 294/119
3,768,853 A * 10/1973 Rennie .................... B66C 1/585 294/110.1

(Continued)

FOREIGN PATENT DOCUMENTS

CN 109704189 A 5/2019
WO 2011008091 A1 1/2011

OTHER PUBLICATIONS

Henan Huabei Lifting Hook Co., Ltd, Scissor Llifting Clamp, Oct. 16, 2020, China.

(Continued)

*Primary Examiner* — Paul T Chin
(74) *Attorney, Agent, or Firm* — Brunet & Co. Ltd.; Robert Brunet; Hans Koenig

(57) ABSTRACT

A scissor-type lifting clamp has two locking clutches, one on each side of a central plane separating hoisting arms of the clamp, for automatically locking the clamp in an opened configuration. The use of two locking clutches reduces the overall vertical distance through which the scissor arms need to travel in order to lock the scissor arms in the opened configuration once an object gripped by the clamp is delivered by the clamp, thereby permitting the use of the clamp with a smaller vehicle, such as a skid steer. A height adjustable outrigger oriented to engage a top of the object to be clamped cooperates with the two locking clutches to further reduce required overall vertical travel distance of the clamp to lock the clamp in the opened configuration.

13 Claims, 12 Drawing Sheets

(56) References Cited

U.S. PATENT DOCUMENTS

| | | | | | |
|---|---|---|---|---|---|
| 4,262,952 | A * | 4/1981 | Bradley | B66C 1/422 294/118 |
| 4,682,931 | A | 7/1987 | House | |
| 4,743,056 | A | 5/1988 | Oliason | |
| 5,979,961 | A * | 11/1999 | Carey | B66F 9/184 294/110.2 |
| 6,123,376 | A | 9/2000 | Yakushinji | |
| 6,286,881 | B1 | 9/2001 | Yakushinji | |
| 6,322,120 | B1 * | 11/2001 | Carey | B66C 1/422 294/110.2 |
| 6,325,434 | B1 * | 12/2001 | Takao | B66C 1/422 294/119 |
| 6,331,025 | B1 | 12/2001 | Douglas | |
| 6,568,731 | B2 * | 5/2003 | Alexander, III | B66C 1/58 294/119 |
| 7,673,917 | B2 | 3/2010 | Oliason | |
| 7,673,918 | B2 | 3/2010 | Cveykus | |
| 8,870,253 | B2 | 10/2014 | Mongan et al. | |
| 10,654,690 | B2 | 5/2020 | Nguyen | |

OTHER PUBLICATIONS

Pfeifer Seil-Und Hebetechnik Gmbh, Lifting Clamps and Grabs, 2014/15, Germany.

* cited by examiner

LIFTING CLAMP

CROSS-REFERENCE TO RELATED APPLICATIONS

This application claims the benefit of U.S. Provisional Patent application Ser. No. 63/128,271 filed Dec. 21, 2021, the entire contents of which is herein incorporated by reference.

FIELD

This application relates to lifting clamps, in particular to lifting clamps with a scissor structure.

BACKGROUND

Various clamping devices are known in the art, which have pivoting arms with opposed jaws for gripping an object therebetween, for example U.S. Pat. No. 6,331,025 issued Dec. 18, 2001, U.S. Pat. No. 10,654,690 issued May 19, 2020 and U.S. Pat. No. 7,673,918 issued Mar. 9, 2010, all of which are herein incorporated by reference. Such devices are typically hooked to a machine such as a backhoe, the devices suspended from the machine and used to clamp an object, which the machine then transports to a different location. Devices of the prior art generally suffer from the necessity to use a large machine to accommodate large vertical travel distances of the pivoting arms during operation of the devices. Such devices are therefore not readily usable with smaller machines, such as skid steer loaders typically used in the landscaping industry.

There remains a need for a clamping device for objects, such as stone blocks, that are usable with small loading machines such as skid steer loaders.

SUMMARY

A lifting clamp comprises: a lifting lug connectable to a lifting machine; a first hoisting arm pivotally connected to and extending away from the lifting lug on a first side of a central plane through the lifting lug, and a second hoisting arm pivotally connected to and extending away from the lifting lug on a second side of the central plane such that the central plane is between the first and second hoisting arms; a first scissor arm pivotally connected to the first hoisting arm, the first scissor arm extending away from the first hoisting arm to cross through the central plane to the second side of the central plane, and a second scissor arm pivotally connected to the second hoisting arm, the second scissor arm extending away from the second hoisting arm to cross through the central plane to the first side of the central plane; a cross-brace pivotally connected to the first scissor arm on the second side of the central plane and pivotally connected to the second scissor arm on the first side of the central plane; a first gripper connected to the first scissor arm, and a second gripper connected to the second scissor arm; at least two locking clutches and at least two corresponding clutch receivers, the clutch receivers configured to receive the locking clutches and the locking clutches configured to be lockable in the clutch receivers for preventing pivoting of the first and second hoisting arms and the first and second scissor arms when the first and second grippers are in an opened configuration; and, at least one outrigger mounted on the cross-brace, the at least one outrigger oriented to engage a top of an object to be clamped between the first and second grippers.

In one aspect, a lifting clamp comprises: a lifting lug connectable to a lifting machine; a first hoisting arm pivotally connected to and extending away from the lifting lug on a first side of a central plane through the lifting lug, and a second hoisting arm pivotally connected to and extending away from the lifting lug on a second side of the central plane such that the central plane is between the first and second hoisting arms; a first scissor arm pivotally connected to the first hoisting arm, the first scissor arm extending away from the first hoisting arm to cross through the central plane to the second side of the central plane, and a second scissor arm pivotally connected to the second hoisting arm, the second scissor arm extending away from the second hoisting arm to cross through the central plane to the first side of the central plane; a cross-brace pivotally connected to the first scissor arm on the second side of the central plane and pivotally connected to the second scissor arm on the first side of the central plane; a first gripper connected to the first scissor arm, and a second gripper connected to the second scissor arm; at least two locking clutches and at least two corresponding clutch receivers, the clutch receivers configured to receive the locking clutches and the locking clutches configured to be lockable in the clutch receivers for preventing pivoting of the first and second hoisting arms and the first and second scissor arms when the first and second grippers are in an opened configuration; and, at least one outrigger mounted on the cross-brace, the at least one outrigger oriented to engage a top of an object to be clamped between the first and second grippers, the at least one outrigger comprising a shoe for engagement with the top of the object, an elongated element extending from the shoe, a mounting plate mounted on the cross-brace, the mounting element comprising an aperture for receiving the elongated element and a releasable and securable securement element for securing the elongated element in the aperture of the mounting plate and for permitting the elongated element with the shoe to be adjustable vertically in relation to the cross-brace, wherein lifting the lifting lug causes the first and second hoisting arms to pivot toward each other and toward the central plane, the first and second scissor arms to pivot toward each other and toward the central plane and the first and second grippers to pivot toward each other and toward the central plane to clamp the object disposed between the first and second grippers.

Also, a locking clutch, particularly for use with the lifting clamp, comprises: a housing having an internal bore; a cam body comprising a plurality of cams, the cam body situated in the bore proximate a distal end of the bore; a mechanical helical compression spring seated in the bore in the housing between a proximal end of the bore and the cam body; and, an elongated clutch stem seated on the spring in the bore such that the spring biases the clutch stem distally in the bore, wherein the clutch stem extends from the spring through the cam body and out of the housing, the clutch stem is rotatable within the bore, the clutch stem comprises a locking disc situated at a distal end thereof whereby the locking disc rotates with rotation of the clutch stem, and the locking disc is configured to be insertable into a corresponding clutch receiver when the locking disc is rotated to an unlocking position and the locking disc is configured to engage with an inner surface of the clutch receiver when the locking disc is rotated to a locking position to prevent the locking disc from exiting the clutch receiver when the locking disc is rotated to the locking position, and the clutch stem comprises a plurality of cam stops that engage the cam body to automatically rotate the clutch stem when the clutch stem is biased distally by the spring and when the clutch stem is biased proximally against the spring by an external force on the clutch stem, wherein the plurality of cam stops engages the plurality of cams during rotation of the clutch stem when the clutch stem is biased distally to stop rotation of the clutch stem at a first rotational position and the plurality of cam stops engages the plurality of cams during rotation of the clutch stem when the clutch stem is biased proximally to stop rotation of the clutch stem at a second rotational position different from the first rotational position thereby automatically switching the locking clutch between the locking and unlocking positions.

In some embodiments, at least one of the locking clutches comprises the locking clutch described above.

In some embodiments, the lifting lug causes the first and second hoisting arms to pivot toward each other and toward the central plane, the first and second scissor arms to pivot toward each other and toward the central plane and the first and second grippers to pivot toward each other and toward the central plane to clamp the object disposed between the first and second grippers.

In some embodiments, the cross-brace is mountable at two or more positions on the first scissor arm and at two or more corresponding positions on the second scissor arm to permit adjustment of maximum and minimum span between the first gripper and the second gripper. In some embodiments, at least a part of the at least one outrigger is adjustable vertically in relation to the cross-brace. In some embodiments, the mounting plate is mounted on the cross-brace. In some embodiments, the at least one outrigger comprises a shoe for engagement with the top of the object, an elongated element extending from the shoe, a mounting plate comprising an aperture for receiving the elongated element and a securement element for securing the elongated element in the aperture of the mounting plate. In some embodiments. the securement element is releasable and securable to permit the elongated element with the shoe to be adjustable vertically in relation to the cross-brace. In some embodiments, the at least one outrigger comprises two or more outriggers, for example two outriggers. In some embodiments, the at least one outrigger comprises a first outrigger and a second outrigger, the first outrigger mounted on a first outward face of the cross-brace and the second outrigger mounted on a second outward face of the cross-brace opposite the first outrigger.

In some embodiments, the first and second scissor arms each comprise arcuate arm plates. In some embodiments, the first and second grippers are connected to the first and second scissor arms, respectively, at positions on the first and second scissor arms which are closer to the central plane than the positions at which the cross-brace is connected to the first and second scissor arms when the lifting clamp is in a clamping configuration. In some embodiments, the first and second grippers are connected to the first and second scissor arms, respectively, at positions on the first and second scissor arms which are farther from the central plane than the positions at which the cross-brace is connected to the first and second scissor arms when the lifting clamp is in the opened configuration.

In some embodiments, the first and second grippers have first and second gripping faces, respectively, for engagement with the object. In some embodiments, the first and second grippers are pivotally connected to the first and second scissor arms, respectively. In some embodiments, the first and second grippers are counterweighted to automatically vertically orient, under influence of gravity, the first and second gripping faces when the first and second gripping faces are not engaged with the object.

In some embodiments, the at least two locking clutches comprises two locking clutches. In some embodiments, the two locking clutches comprise a first locking clutch mounted on the first hoisting arm and oriented toward the first scissor arm; and, a second locking clutch mounted on the second hoisting arm and oriented toward the second scissor arm.

In some embodiments, the at least two corresponding clutch receivers comprises two clutch receivers. In some embodiments, the two clutch receivers comprise a first clutch receiver situated on the first scissor arm and oriented to receive the first locking clutch when the first hoisting arm and the first scissor arm pivot toward each other, and a second clutch receiver situated on the second scissor arm and oriented to receive the second locking clutch when the second hoisting arm and the second scissor arm pivot toward each other.

In some embodiments, one, two or more of the locking clutches comprises a rotatable locking disc and each of the corresponding clutch receivers comprises a clutch receiving aperture complementary to the rotatable locking disc. In some embodiments, the clutch receiving aperture has an opening through which the rotatable locking disc can be inserted when the rotatable locking disc is rotated to an unlocking position. In some embodiments, the clutch receiving aperture has an inner surface that can engage the rotatable locking disc to prevent the rotatable locking disc from exiting the clutch receiving aperture when the rotatable locking disc is rotated to a locking position within the clutch receiving aperture.

The use of at least two locking clutches in the lifting clamp permits placement of the locking clutches and clutch receivers at positions more remote from the central plane of the lifting clamp, which leads to less vertical travel of the hoisting arms and scissor arms between a locked fully opened configuration and an unlocked clamping configuration, while ensuring that the arms of the lifting clamp are stable and balanced on both sides of the lifting clamp in the locked fully opened configuration. Maintaining the stability and balance of the arms on both sides of the lifting clamp facilitates proper placement of the grippers when trying to position the grippers around the object prior to clamping. Use of only one clutch requires the clutch to be closer to the central plane to ensure stability and balance when the clamp is in the locked fully opened configuration, which leads to the arms of the clamp having a vertical travel distance that is less effective for a skid steer loader. Further, the use of at least two clutches provides redundancy, which permits the continued use of the lifting clamp, albeit less effectively, and more importantly increases safety in the event of failure of one of the clutches. Furthermore, utilization of a height adjustable outrigger to engage the top of the object cooperates with the locking clutches to further facilitate proper placement of the grippers on the object so that the grippers grip the object in the most desirable position by which the object is to be lifted. The lifting clamp thereby can have a shorter overall operating range than similar scissor-type clamps in the art, while also having a low overall height and a low overall thinness.

The lifting clamps is useful for lifting, moving and placing any type of object with the aid of any of the usual machines, but is particularly useful for lifting, moving and placing stone blocks with the aid of small loading machines such as skid steer loaders.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1A:
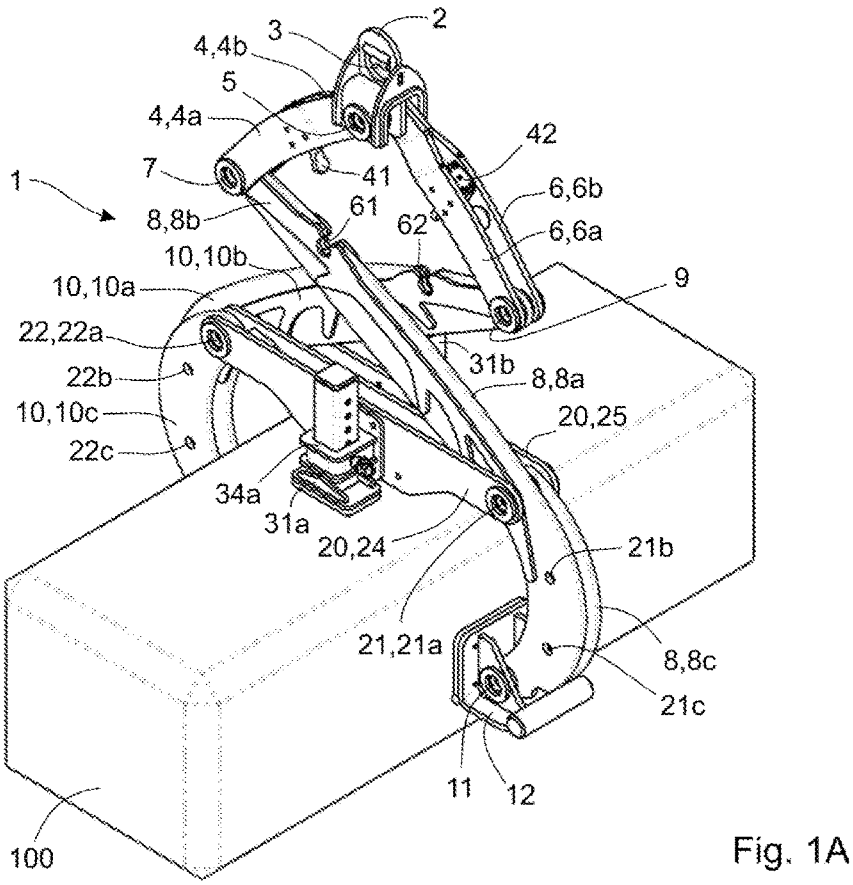
FIG. 1A depicts a perspective view of a lifting clamp with jaws closed on a block.
Figure 1B:
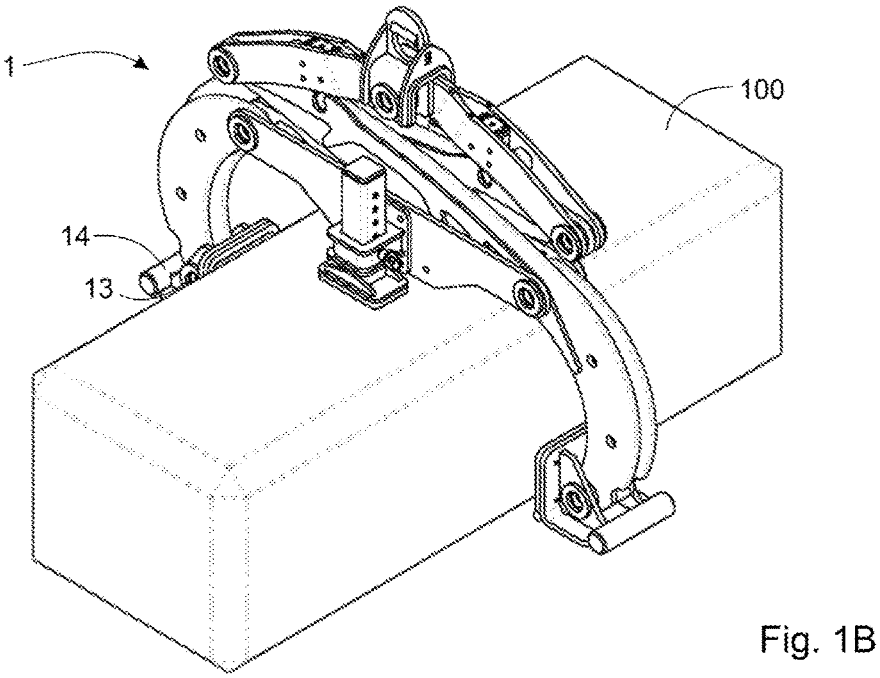
FIG. 1B depicts the lifting clamp of FIG. 1A with the jaws opened.
Figure 2B:
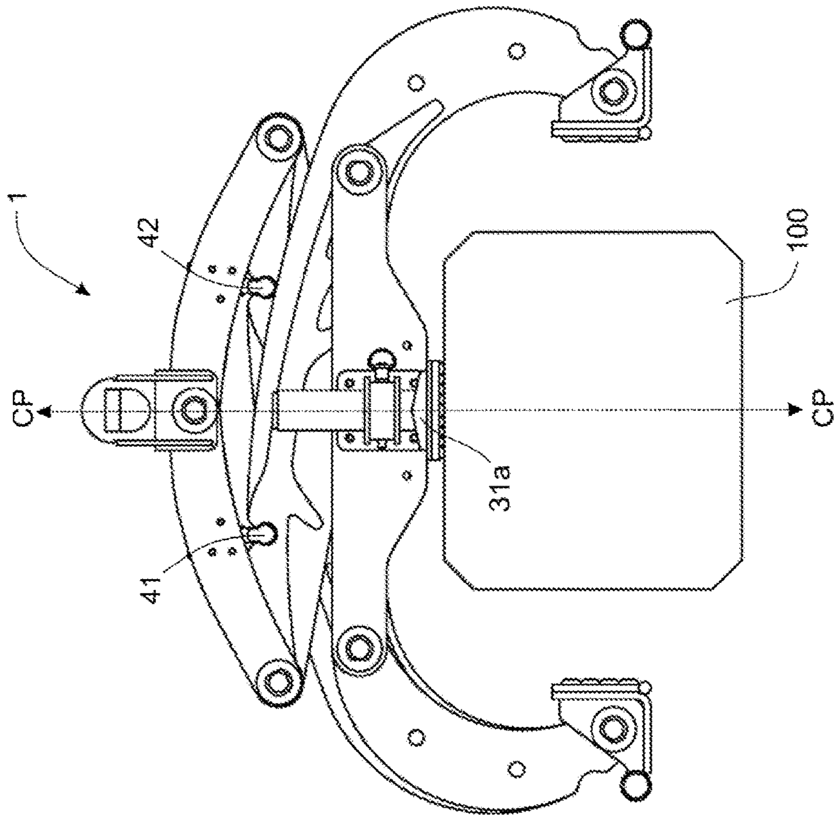
FIG. 2B depicts a front view of the lifting clamp of FIG. 1B.
Figure 2A:
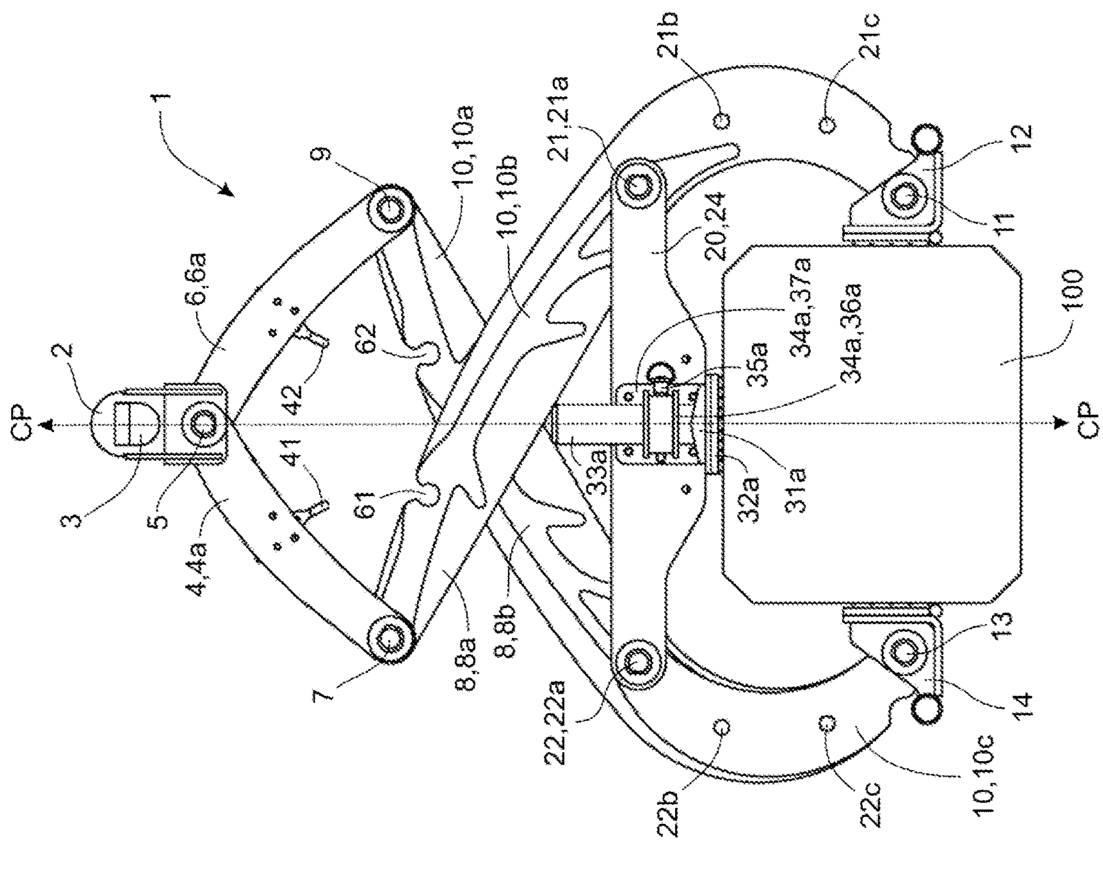
FIG. 2A depicts a front view of the lifting clamp of FIG. 1A.
Figure 3A:
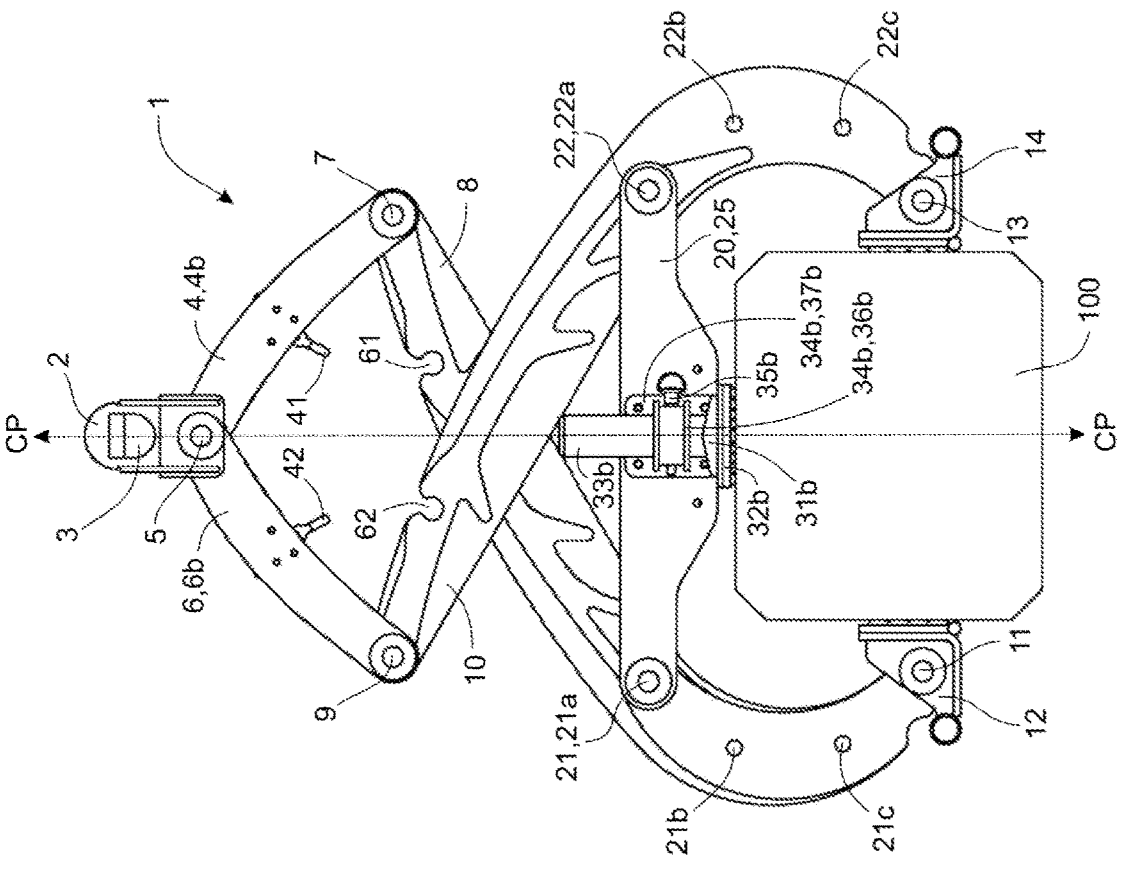
FIG. 3A depicts a rear view of the lifting clamp of FIG. 1A.
Figure 3B:
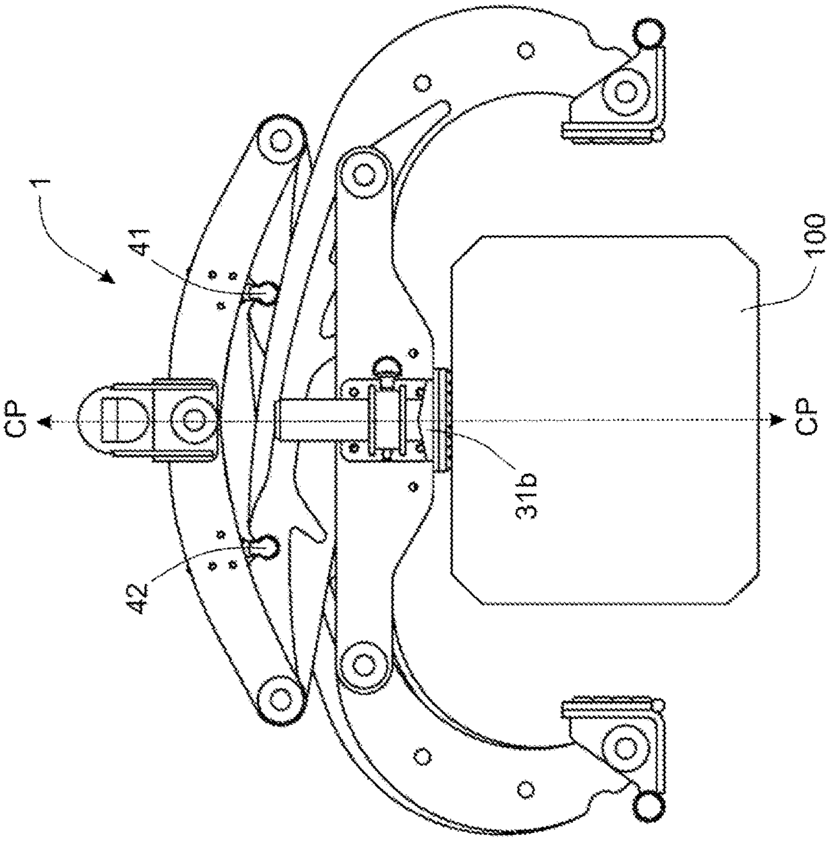
FIG. 3B depicts a rear view of the lifting clamp of FIG. 1B.
Figure 4B:
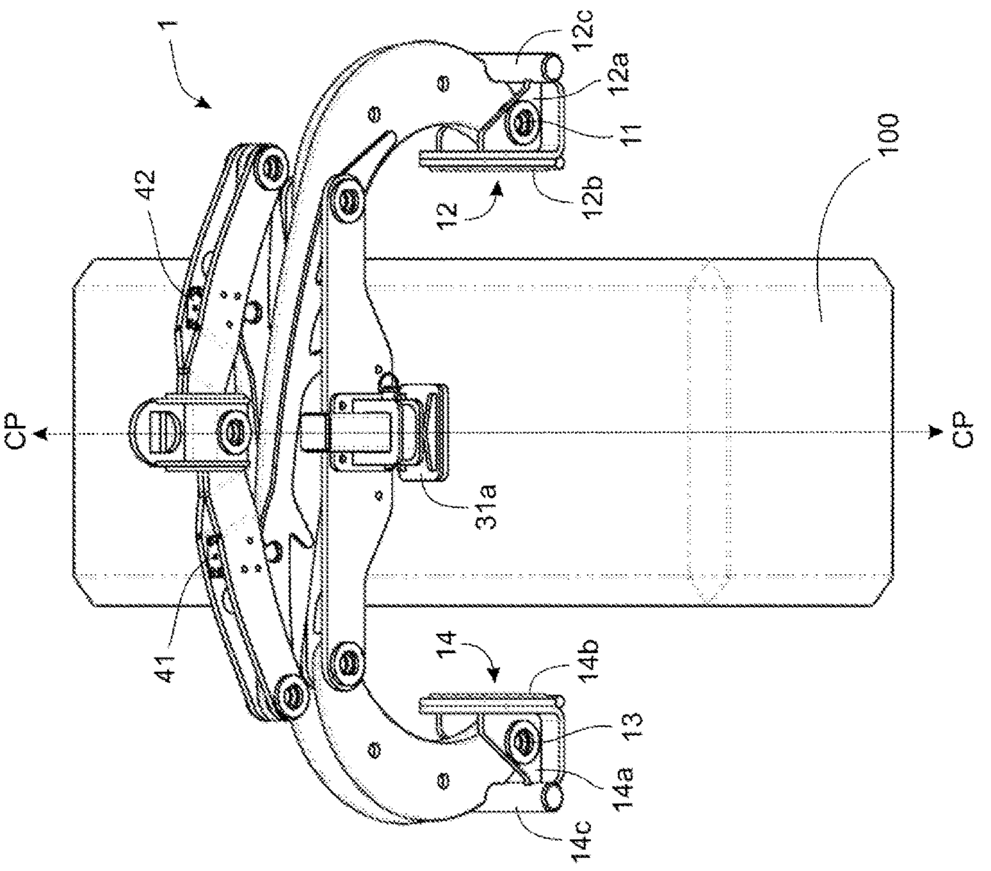
FIG. 4B depicts an alternative perspective view of the lifting clamp of FIG. 1B.
Figure 4A:
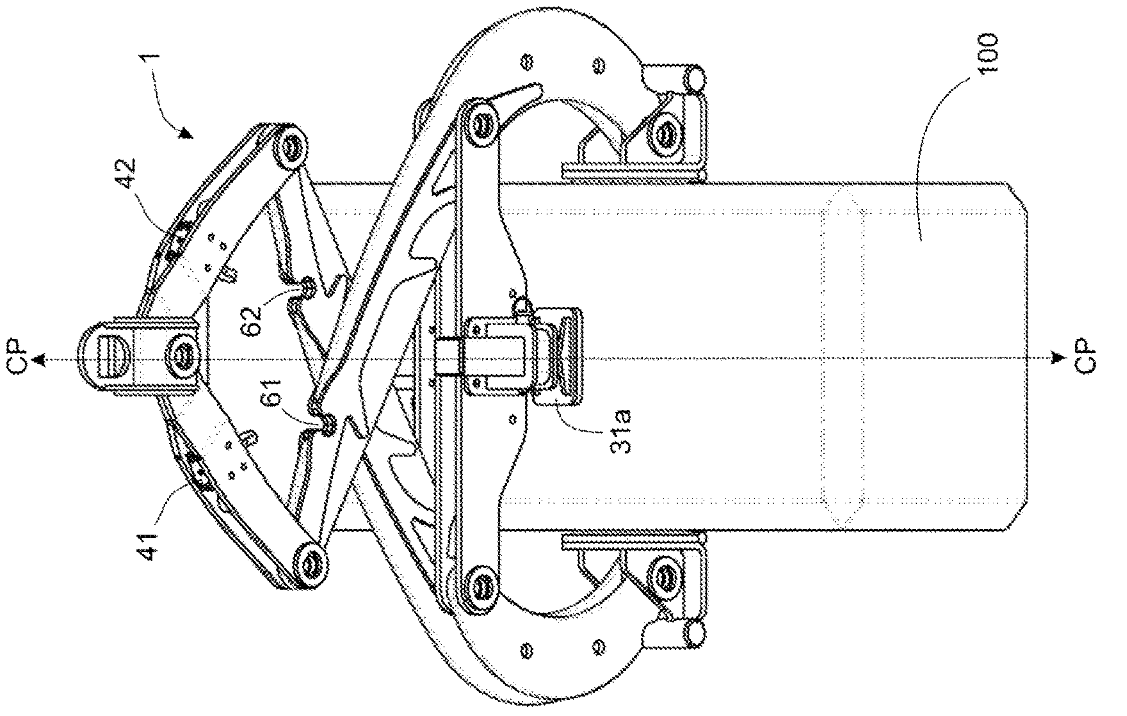
FIG. 4A depicts an alternative perspective view of the lifting clamp of FIG. 1A.
Figure 5A:
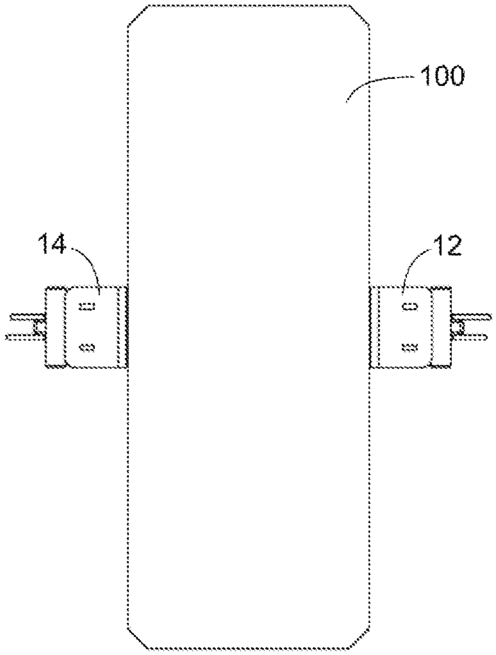
FIG. 5A depicts a bottom view of the lifting clamp of FIG. 1A.
Figure 5B:
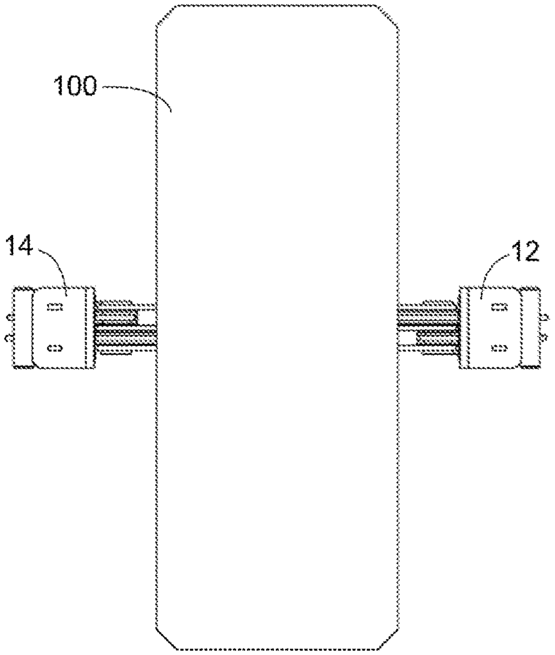
FIG. 5B depicts a bottom view of the lifting clamp of FIG. 1B.
Figure 5C:
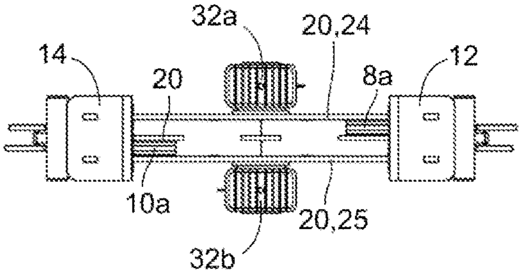
FIG. 5C depicts FIG. 5A without an object between grippers of the lifting clamp.
Figure 5D:
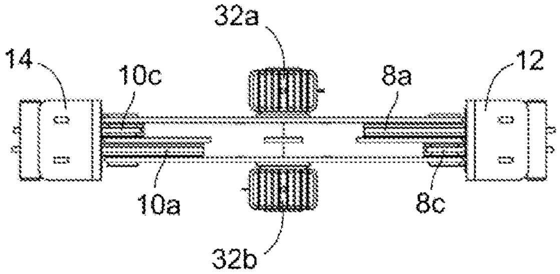
FIG. 5D depicts FIG. 5B without an object between grippers of the lifting clamp.
Figure 6C:
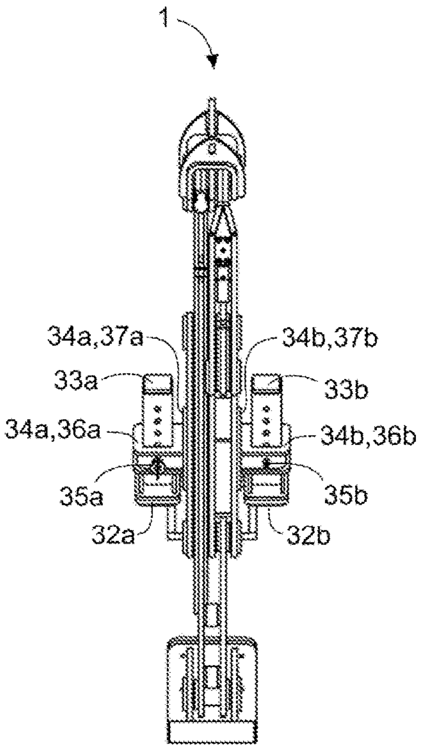
FIG. 6C depicts FIG. 6A without an object between grippers of the lifting clamp.
Figure 6A:
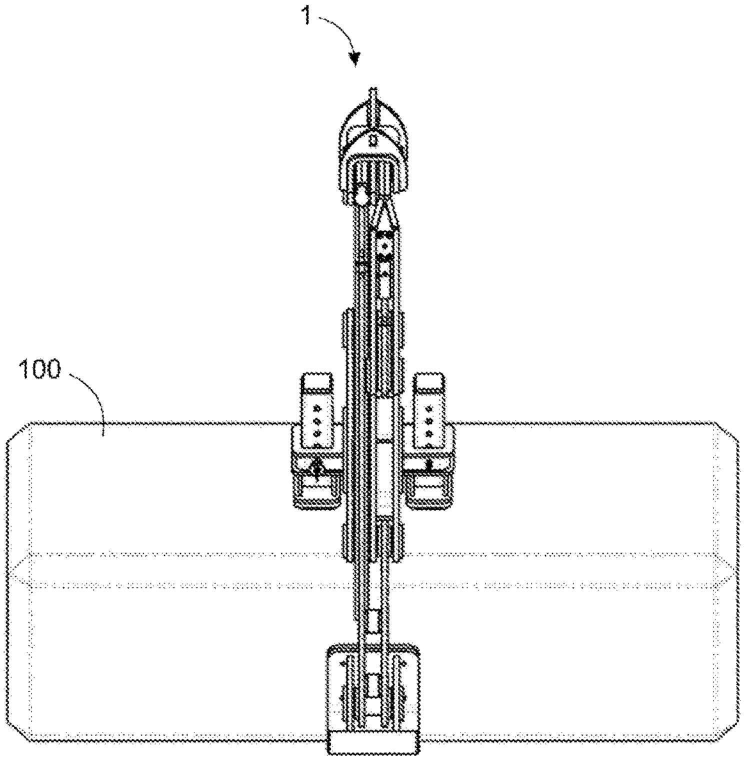
FIG. 6A depicts an edge view of the lifting clamp of FIG. 1A.
Figure 6D:
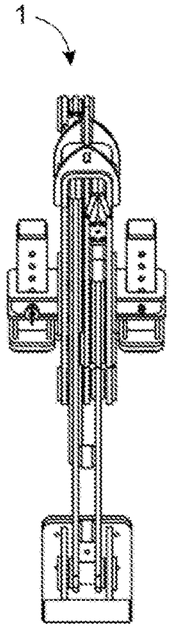
FIG. 6D depicts FIG. 6B without an object between grippers of the lifting clamp.
Figure 6B:
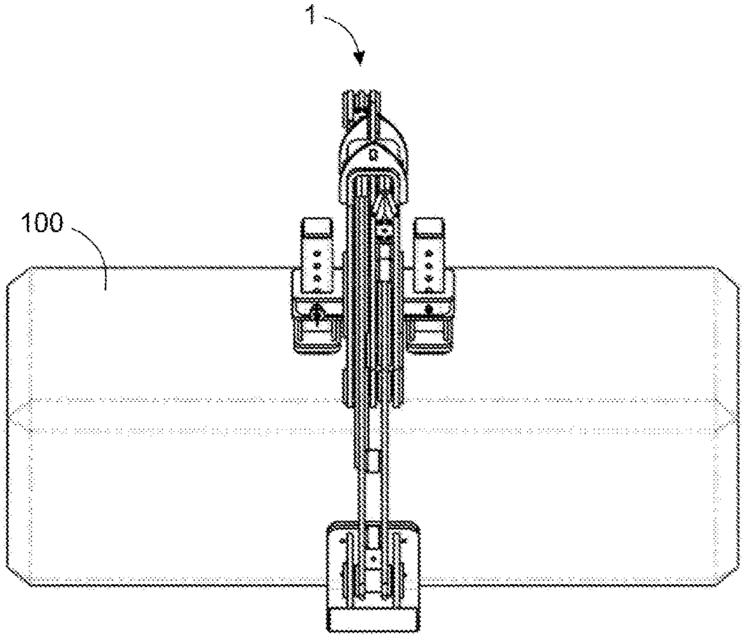
FIG. 6B depicts an edge view of the lifting clamp of FIG. 1B.

With reference to FIG. 1A to FIG. 6D, a scissor-type lifting clamp 1 comprises a lifting lug 2, which is connectable to a lifting machine, for example a backhoe, a mini excavator, a skid steer loader, etc., especially a skid steer loader. The lifting lug 2 comprises a through-aperture 3 through which a line or a hook can be inserted. The lifting clamp 1 further comprises a first hoisting arm 4 and a second hoisting arm 6 both pivotally connected at proximal ends thereof to the lifting lug 2 at a common pivot pin 5 inserted through the hoisting arms 4, 6 and the lifting lug 2. The first and second hoisting arms 4, 6 extend away from the common pivot pin 5 to opposite sides of the lifting lug 2. A central plane CP of the lifting clamp 1 running through a center of the lifting lug 2 and through the common pivot pin 5 divides the lifting clamp 1 vertically into a first side to which the first hoisting arm 4 extends, and a second side to which the second hoisting arm 6 extends. The central plane CP defines a plane of symmetry through which the various component of the lifting clamp 1 on the first and second sides are symmetrically reflected.

Distal ends of the first and second hoisting arms 4, 6 are pivotally connected to proximal ends of first and second scissor arms 8, 10, respectively, at first and second arm connection pins 7, 9, respectively. The first scissor arm 8 extends from the distal end of the first hoisting arm 4 toward the central plane CP, crosses past the central plane CP to the second side of the lifting clamp 1 and then curves back in an arc toward the first side of the lifting clamp 1 terminating at a distal end on the second side of the lifting clamp 1. The second scissor arm 10 extends from the distal end of the second hoisting arm 6 toward the central plane CP, crosses past the central plane CP to the first side of the lifting clamp 1 and then curves back in an arc toward the second side of the lifting clamp 1 terminating at a distal end on the first side of the lifting clamp 1. A first gripper 12 is pivotally mounted on the distal end of the first scissor arm 8 on the second side of the lifting clamp 1 through a first gripper connecting pin 11. A second gripper 14 is pivotally mounted on the distal end of the second scissor arm 10 on the first side of the lifting clamp 1 through a second gripper connecting pin 13. The first and second grippers 12, 14 oppose each other through the central plane CP and function to grip an object 100 (e.g., a stone block, a rock, a box, etc.) therebetween.

The first and second grippers 12, 14 are constructed in the same manner. The first and second grippers 12, 14 comprise gripper bodies 12*a*, 14*a*, respectively, comprising L-brackets with two spaced-apart gussets connecting bottom and vertical flanges of the L-brackets. The first and second gripper connecting pins 11, 13 are inserted through apertures in the gussets of respective gripper bodies 12*a*, 14*a*. The first and second grippers 12, 14 further comprise respective first and second gripper pads 12*b*, 14*b* attached to the object-facing face of the respective vertical flanges of the respective L-brackets. The first and second gripper pads 12*b*, 14*b* are comprised of a suitable material and have suitably textured first and second gripping faces, respectively, for gripping the object 100. The first and second gripper pads 12*b*, 14*b* grip the object 100 during operation of the lifting clamp 100. Furthermore, first and second counterweights 12*c*, 14*c*, respectively, are attached to ends the respective bottom flanges of the respective L-brackets to automatically vertically orient, under influence of gravity, the first and second gripping faces when the first and second gripping faces are not engaged with the object 100.

The lifting clamp 1 further comprises a cross-brace 20 pivotally connected to the first scissor arm 8 on the second side of the lifting clamp 1 through a first brace pivot pin 21, and the cross-brace 20 is also pivotally connected to the second scissor arm 10 on the first side of the lifting clamp 1 through a second brace pivot pin 21. The cross-brace 20 is located below a location where the first and second scissor arms 8, 10, respectively, cross the central plane CP. The cross-brace 20 is connected to the first and second scissor arms 8, 10, respectively, at positions 21*a*,22*a*, respectively. Accessory apertures 21*b*, 22*b*, 21*c* and 22*c* are located lower on the first and second scissor arms 8, 10 toward the first and second grippers 12, 14 in regions where the first and second scissor arms 8, 10 curve back in an arc toward the opposite side of the lifting lug 1. The accessory apertures 21*b*, 22*b*, 21*c* and 22*c* are used for mounting accessories such as an adjustable handle and/or adapters that permit lifting differently shaped objects.

The first and second hoisting arms 4, 6 each comprise a pair of parallel spaced-apart arcuate elongated flat plates. Thus, the first hoisting arm 4 comprises first hoisting plates 4*a*, 4*b*, and the second hoisting arm 6 comprises second hoisting plates 6*a*, 6*b*. The first and second scissor arms 8, 10 also comprise parallel spaced-apart arcuate elongated flat arm plates. Thus, the first scissor arm 8 comprises first scissor plates 8*a*, 8*b*, 8*c*. The long plate 8*a* is pivotally connected to the first hoisting arm 4, and the cross-brace 20 and the first gripper 12, the medium length plate 8*b* is pivotally connected to the first hoisting arm 4 and the cross-brace 20, and the short plate 8*c* is pivotally connected to the cross-brace 20 and the first gripper 12. Likewise, the second scissor arm 10 comprises second scissor plates 10*a*, 10*b*, 10*c*. The long plate 10*a* is pivotally connected to the second hoisting arm 6, and the cross-brace 20 and the second gripper 14, the medium length plate 10*b* is pivotally connected to the second hoisting arm 6 and the cross-brace 20, and the short plate 10*c* is pivotally connected to the cross-brace 20 and the second gripper 14.

The cross-brace 20 comprises a pair of parallel spaced-apart elongated flat plates, including a first brace plate 24 and a second brace plate 25, between which are mounted the first scissor plates 8*a*, 8*b*, 8*c* and the second scissor plates 10*a*, 10*b*, 10*c*.

Figure 7:
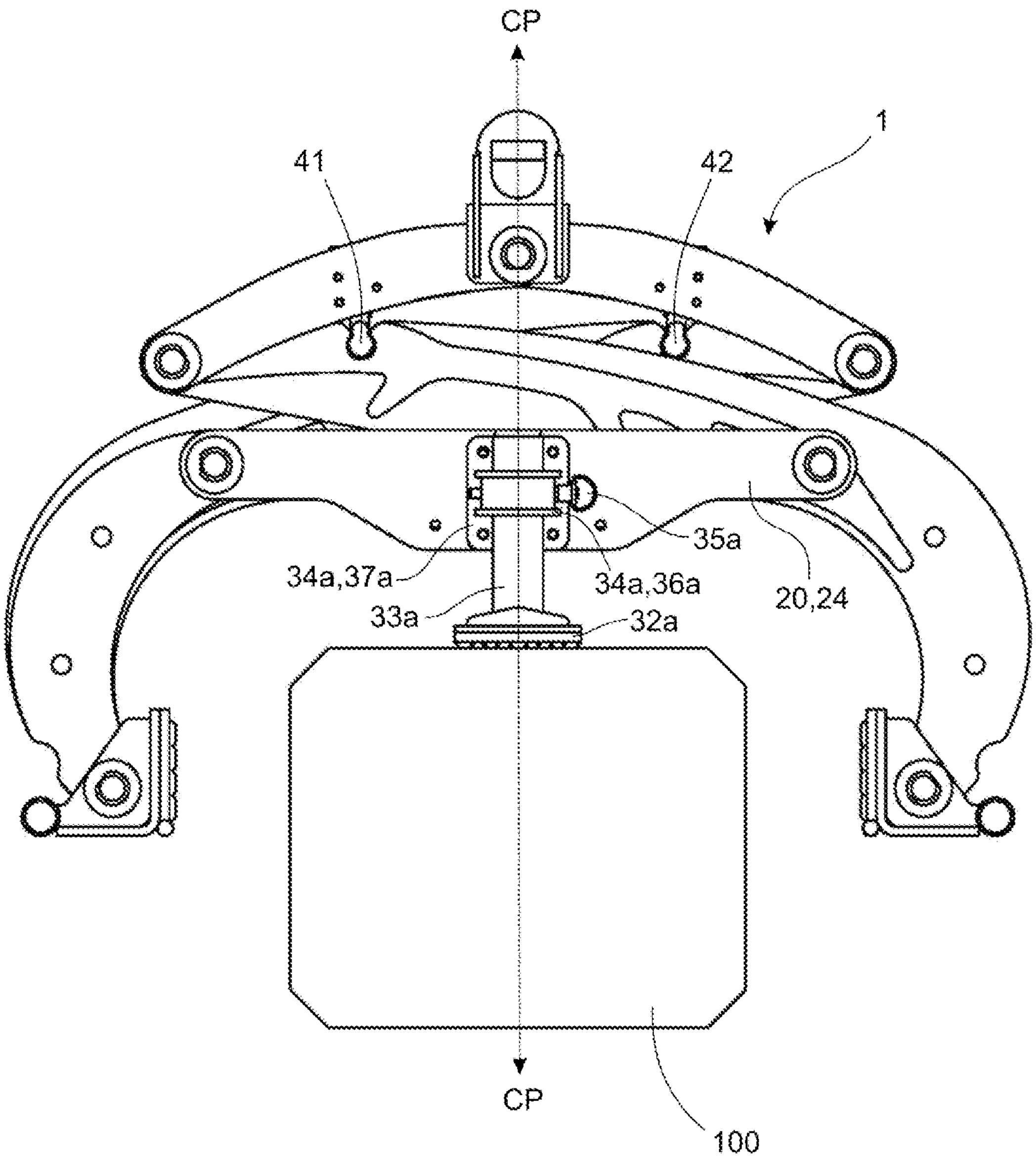
FIG. 7 depicts a front view of the lifting clamp of FIG. 1B with an outrigger at a different position.

The lifting clamp 1 further comprises a first outrigger 31*a* and a second outrigger 31*b*. The first and second outriggers 31*a*, 31*b* are mounted on outsides of the first brace plate 24 and the second brace plate 25, respectively, in the central plane CP on opposite faces of the cross-brace 20. The first and second outriggers 31*a*, 31*b* are constructed in the same manner and comprise: first and second shoes 32*a*, 32*b*, respectively, for engagement with a top of the object 100; elongated elements 33*a*, 33*b*, respectively, extending from the shoes 32*a*, 32*b*; mounting plates 34*a*, 34*b*, respectively, for mounting the first and second outriggers 31*a*, 31*b* to the first and second brace plates 24, 25, respectively; and, removable mounting pins 35*a*, 35*b*, respectively for securing the elongated elements 33*a*, 33*b*, respectively, in apertures in horizontal elements 36*a*, 36*b*, respectively, of the mounting plates 34*a*, 34*b*, respectively. The first and second outriggers 31*a*, 31*b* are mounted on outward faces of the first and second brace plates 24, 25, respectively, through vertical elements 37*a*, 37*b*, of the mounting plates 34*a*, 34*b*, respectively. The removable mounting pins 35*a*, 35*b* are each inserted through one of a plurality of vertically-spaced holes in the elongated elements 33*a*, 33*b*. With further reference to FIG. 7, the mounting pins 35*a*, 35*b* are easily removed to permit vertical adjustment of the elongated elements 33*a*, 33*b*, respectively, with respect to the first and second brace plates 24, 25, respectively, since the elongated elements 33*a*, 33*b* are able to move vertically within the apertures in the horizontal elements 36*a*, 36*b*, respectively, to be secured so that the first and second shoes 32*a*, 32*b* are at a desired distance below the cross-brace 20 depending on the size of the object 100 and the required vertical travel distance of the first and second hoisting arms 4, 6 and the first and second scissor arms 8, 10. The height adjustable first and second outriggers 31*a*, 31*b* limit downward movement of the arms 4, 6, 8, 10 of the lifting clamp 1 when engaging the object 100 so that further downward motion can unlock the lifting clamp 1. The shoes first and second shoes 32*a*, 32*b* of the first and second outriggers 31*a*, 31*b* can be quickly moved higher or lower on the lifting clamp 1, as needed.

The lifting clamp 1 further comprises a clutching mechanism 40 for locking the lifting clamp 1 in an opened configuration so that the lifting clamp 1 can be more easily positioned with the object 100 between the first and second grippers 12, 14 prior to clamping the object 100. The clutching mechanism 40 comprises a first locking clutch 41 and a second locking clutch 42, together with a first locking aperture 61 for receiving the first locking clutch 41 and a second locking aperture 62 for receiving the second locking clutch 42. The first and second locking clutches 41, 42 are mounted on the first and second hoisting arms 4, 6, respectively, between the first hoisting plates 4*a*, 4*b* and second hoisting plates 6*a*, 6*b*, respectively. The first and second locking clutches 41, 42 are oriented downwardly towards the first and second scissor arms 8, 10, respectively. The first and second locking clutches 41, 42 are located on the respective hoisting arms 4, 6 at locations remote from the central plane CP. Preferably, the distance between the central plane CP and the first locking clutch 41 is the same as the distance between the central plane CP and the second locking clutch 42 to maintain symmetry through the central plane CP for improved stability and balance of the lifting clamp 1.

The use of two clutches on the hoisting arms, one clutch on each side of the central plane and two corresponding clutch receivers on the scissors arms permits locating the clutches farther away from the central plane, which results in requiring less vertical travel distance of the hoisting and scissor arms so that the lifting clamp is better suited for use with a smaller lifting machine, such as a skid steer loader.

The first and second locking apertures 61, 62, respectively, receive the first and second locking clutches 41, 42, respectively, and permit securement of the first and second locking clutches 41, 42 therein. The first and second locking apertures 61, 62 are situated on an upper edge of the first and second scissor arms 8, 10, respectively, and are oriented to receive the first and second locking clutches 41, 42, respectively, when the first and second hoisting arms 4, 6, respectively, and the first and second scissor arms 8, 10, respectively, pivot toward each other.

In operation, starting from a configuration in which the lifting clamp 1 is fully opened and locked as depicted in FIG. 1B, FIG. 2B, FIG. 3B, FIG. 4B, FIG. 5B and FIG. 6B, the first and second outriggers 31, 32 are adjusted so that the heights of the first and second shoes 32*a*, 32*b* are appropriate for the size of the object 100, and the lifting clamp 1 is maneuvered so that the object 100 is disposed between the first and second grippers 12, 14. The lifting clamp 1 is then lowered so that the first and second shoes 32*a*, 32*b* engage the top of the object 100, whereupon further lowering unlocks the clutching mechanism 40. Details of how the clutching mechanism 40 operates are provided below. Once the clutching mechanism 40 is unlocked, the lifting clamp 1 is raised causing the first and second hoisting arms 4, 6 to pivot about the common pivot pin 5, the distal ends of the first and second hoisting arms 4, 6 thereby moving closer together and closer to the central plane CP. Pivoting of the first and second hoisting arms 4, 6 causes the first and second scissor arms 8, 10 to pivot about the first and second arm connection pins 7, 9, which causes the first and second grippers 12, 14 to move closer together to grip the object 100 therebetween as shown in FIG. 1A, FIG. 2A, FIG. 3A, FIG. 4A, FIG. 5A and FIG. 6A. With the object 100 clamped gripped by the first and second grippers 12, 14, further raising of the lifting clamp 1 lifts the object 100 off the ground so that the lifting machine can move the object 100 to a different location. Once the object 100 is placed on the ground in the different location by lowering the lifting clamp 1, the lifting clamp 1 is lowered further. Because the first and second shoes 32*a*, 32*b* are engaged with the top of the object 100, the first and second hoisting arms 4, 6 pivot about the common pivot pin 5 and the distal ends of the first and second hoisting arms 4, 6 move farther apart and farther from the central plane CP. Pivoting of the first and second hoisting arms 4, 6 in this manner causes the first and second scissor arms 8, 10 to pivot about the first and second arm connection pins 7, 9, which causes the first and second grippers 12, 14 to move farther apart to release the object 100 therebetween. Further lowering of the lifting clamp 1 causes the first and second locking clutches 41, 42 to re-engage the first and second locking apertures 61, 62 automatically locking the first and second locking clutches 41, 42 in the first and second locking apertures 61, 62 in order to hold the lifting clamp 1 in the fully opened configuration as depicted in FIG. 1B, FIG. 2B, FIG. 3B, FIG. 4B, FIG. 5B and FIG. 6B. The lifting clamp 1 is thereby ready to be used to move another object.

The first and second locking clutches 41, 42 are depicted comprising an end having opposed flat faces and an edge surface formed into circle, and the first and second locking apertures 61, 62 are shown as circular apertures complementary to the ends of the first and second locking clutches 41, 42. However, the ends of the locking clutches and the locking apertures may be of any suitable shape such that the locking clutches can be inserted into the locking apertures when the locking clutches are rotated into in one configuration, and, upon rotating the ends of the locking clutches, outer surfaces of the ends of the locking clutches engage inner surfaces of the locking apertures to prevent removal of the locking clutches from the locking apertures thereby locking the locking clutches in the locking apertures.

Further details of the clutching mechanism 40 are illustrated in FIG. 8A to FIG. 10. The clutching mechanism 40 is now described with reference to the first locking clutch 41 and the first locking aperture 61. The second locking clutch 42 and the second locking aperture 62 are constructed and operate in the same manner as the first locking clutch 41 and the first locking aperture 61.

The locking clutch 41 comprises a housing 59 having a bore 58 closed at a proximal end by a cover plate 57 secured to the housing 59 by bolts 56 (only one labeled). A hollow cam body 54 is situated in the bore 58 at a distal end of the bore 58 with a mechanical helical compression spring 55 seated in the bore 58 against the cover plate 57 between the cover plate 57 and the cam body 54. The cam body 54 is secured in the bore 58 by securing pins 50 inserted through opposed apertures 50*a* (only one labeled) in sides of the housing 59 and opposed apertures 50*b* (only one labeled) in the cam body 54. The cam body 54 is generally a hollow cylinder having a circular cross-section that is insertable snugly into the bore 58, the cam body 54 comprising a distal edge surface shaped into two pairs 53*a*, 53*b* of first cams (only one of each pair labeled) situated diametrically across the cam body 54 and a proximal edge surface shaped into two pairs 52*a*, 52*b* of second cams (only one of each pair labeled) situated around the proximal edge of the cam body 54 such that the cams of each pair are opposed to each other diametrically across the cam body 54. The cams 52*a*, 52*b*, 53*a*, 53*b* generally take the form of protrusions from respective proximal and distal edges of the cam body 54, the protrusions preceded by sloping edge surfaces. The locking clutch 41 further comprises a rotatable elongated clutch stem 44 having a locking disc 43 integrally formed with the clutch stem 44 at a distal end of the clutch stem 44, the locking disc 43 rotating with the rotatable clutch stem 44. The clutch stem 44 comprises a first cam stop 45*a* that comprises a pin inserted radially across the clutch stem 44 through a first cam stop through-aperture 45*b*. The clutch stem 44 also comprises a second cam stop 46*a* that comprises a pin inserted radially across the clutch stem 44 through a second cam stop through-aperture 46*b*. The first cam stop 45*a* is situated distally of the second cam stop 46*a* such that when the clutch stem 44 is seated in the bore 58, the cam body 54 is situated between the first and second cam stops 45*a*, 46*a*, respectively. The first cam stop 45*a* is oriented parallel to the second cam stop 46*a*.

In order to assemble the locking clutch 41, the following is done: the cover plate 57 is secured to the housing 59; the compression spring 55 is seated in the bore 58 against the cover plate 57; the cam body 54 is seated in the bore 58 and secured in the bore 58 by the securing pins 50 inserted through the opposed apertures 50*a*; the clutch stem 44, with the first cam stop 45*a* inserted therein to protrude from opposed sides of the clutch stem 44, is inserted into the bore 58 through the cam body 54; the clutch stem 44 is rotated so that the second cam stop through-aperture 46*b* is aligned with an access aperture 51 in a face of the housing 59; and, the second cam stop 46*a* is inserted all the way through the access aperture 51 into the second cam stop through-aperture 46*b* so that the second cam stop 46*a* protrudes from opposed sides of the clutch stem 44 but the second cam stop 46*a* is wholly within the bore 58 so that the clutch stem 44 is rotatable within the bore 58.

Figure 8D:
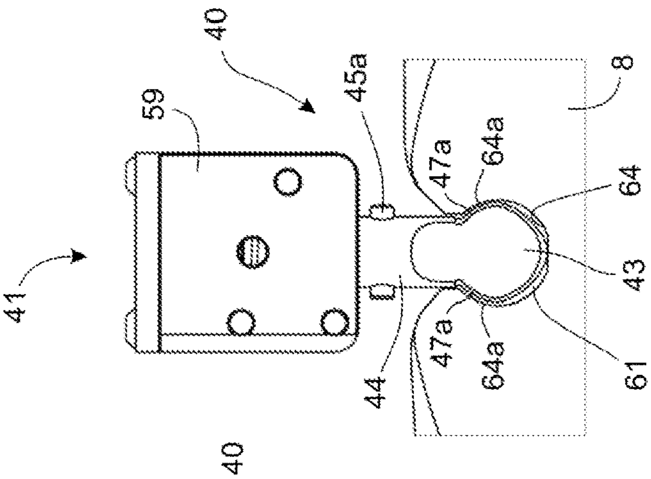
FIG. 8D depicts the clutch of FIG. 8B in a locked configuration fully turned in the receiving aperture.
Figure 8C:
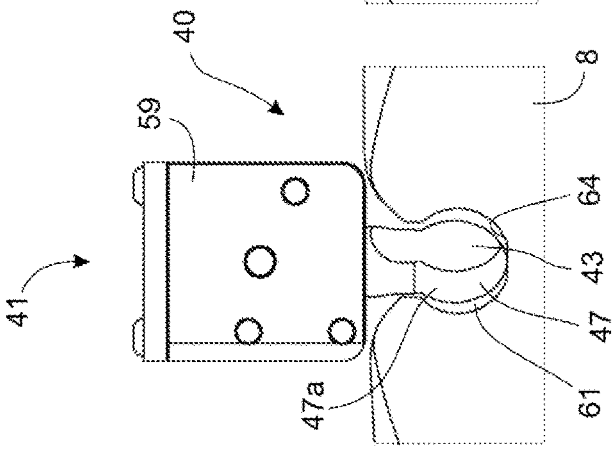
FIG. 8C depicts the clutch of FIG. 8B half-turned in the receiving aperture.
Figure 8B:
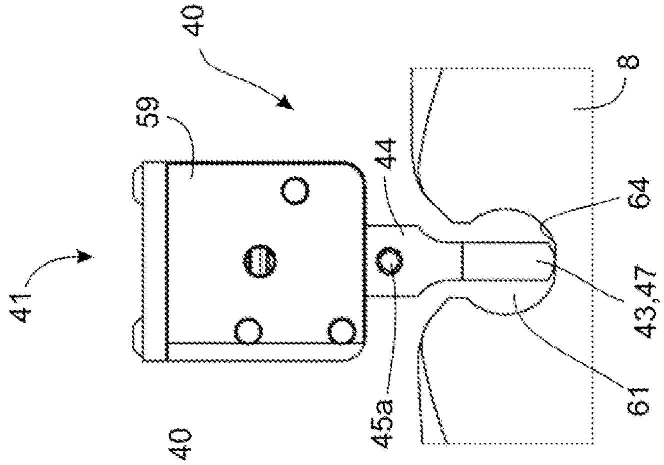
FIG. 8B depicts the clutch of FIG. 8A in the receiving aperture in an unlocked configuration.
Figure 8A:
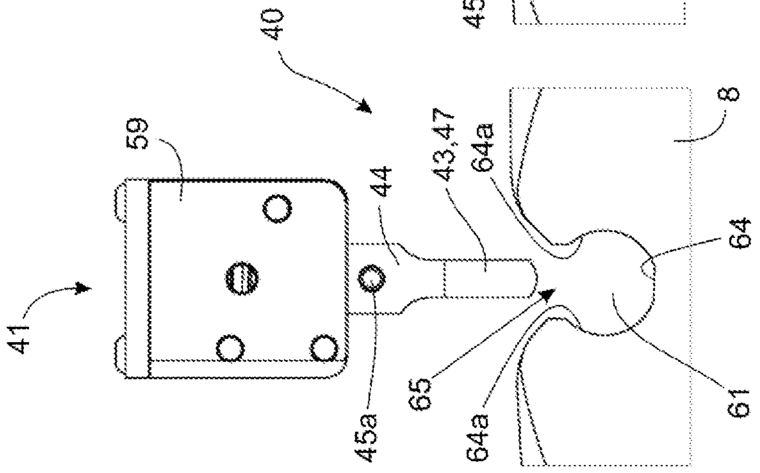
FIG. 8A depicts a magnified view of a clutch and receiving aperture with the clutch outside the aperture.

With specific reference to FIG. 8A to FIG. 8D, general operation of the clutching mechanism 40 is illustrated in a sequence from initial approach of the first locking clutch 41 toward the first locking aperture 61 (FIG. 8A), insertion of the first locking clutch 41 into the first locking aperture 61 (FIG. 8B), initial rotation of the first locking clutch 41 in the first locking aperture 61 (FIG. 8C), and finally the first locking clutch 41 full locked in the first locking aperture 61 (FIG. 8D). The second locking clutch operates in the same manner. As seen in FIG. 8A, as the first locking clutch 41 approaches the first locking aperture 61, the clutch stem 44 is fully extended and rotated so that an arcuate outer edge 47 of the locking disc 43 is perpendicularly oriented with respect to an arcuate edge 64 of the first scissor arm 8 that forms a boundary surface of the corresponding first locking aperture 61. The locking disc 43 can thereby be inserted into the first locking aperture 61 given the slim profile of the locking disc 43 with respect to an opening 65 in the upper part of the first locking aperture 61. In FIG. 8B, the locking disc 43 is in an unlocking position in the first locking aperture 61. Starting at FIG. 8B, as the first locking clutch 41 is further pressed into the first locking aperture 61 so that the outer edge 47 of the locking disc 43 engages the edge 64 that forms the boundary surface of the first locking aperture 61, the clutch stem 44 is forced further into the housing 59 of the first locking clutch 41 and automatically begins to rotate. The mechanism for automatic rotation is explained in more details below with reference to FIG. 9A to FIG. 9C.

Once the clutch stem 44 has rotated through 45°, the first locking clutch 41 is lifted slightly and the compression spring 55 (see FIG. 9A to FIG. 9C) forces the clutch stem 44 to extend and rotate another 45° with the arcuate outer edge 47 of the locking disc 43 now oriented parallel the arcuate edge 64 of the boundary surface of the locking aperture 61 (see FIG. 8D). FIG. 8D shows the first locking clutch 41 in the locking position, in which an upper arcuate surface 47*a* of the arcuate outer edge 47 of the locking disc 43 is engaged with a corresponding upper arcuate surface 64*a* of the boundary surface of the locking aperture 61. With the clutch stem 44 extended, the clutch stem 44 is unable to rotate (as explained in more detail below in relation to FIG. 9A to FIG. 9C) and the first locking clutch 41 is in the locking position. The first locking clutch 41 can be unlocked from the locking position by reversing the steps starting with lowering the first locking clutch 41 so that the clutch stem 44 is forced upward, which automatically releases the clutch stem 44 to be rotated again into the unlocking position.

Figure 9A:
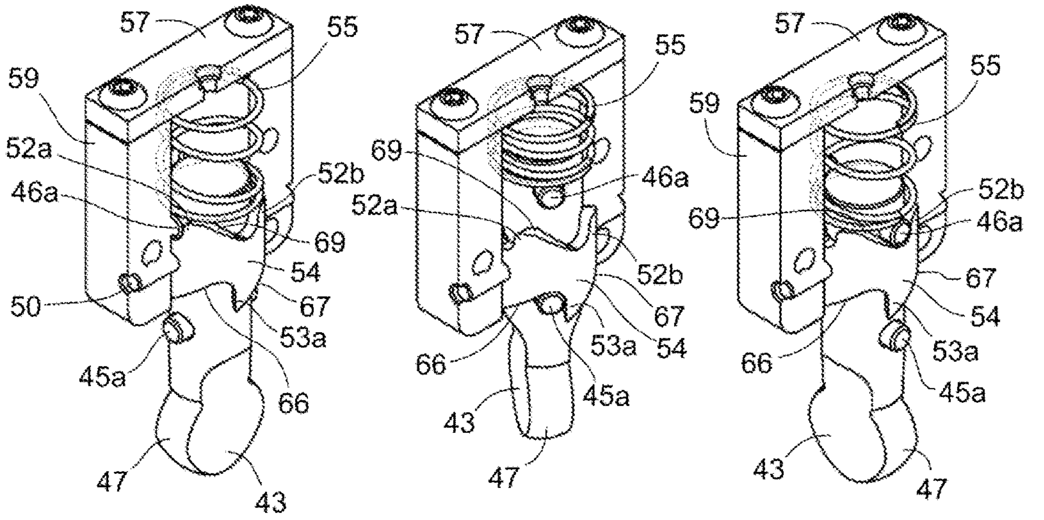
FIG. 9A depicts a perspective view of a series of three images of a clutching mechanism as the clutch of FIG. 8A cycles from a locked configuration to an unlocked configuration.
Figure 9B:
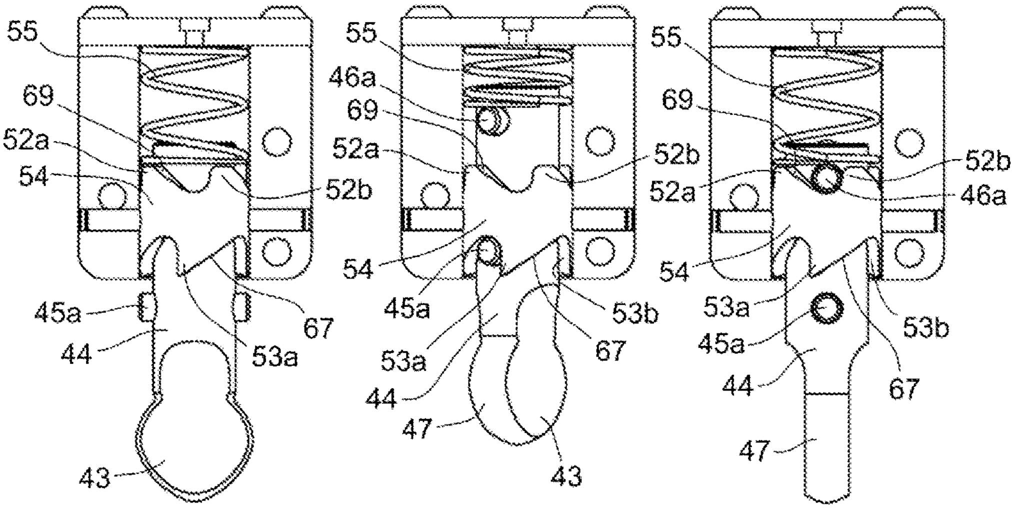
FIG. 9B depicts a front view of FIG. 9A.
Figure 9C:
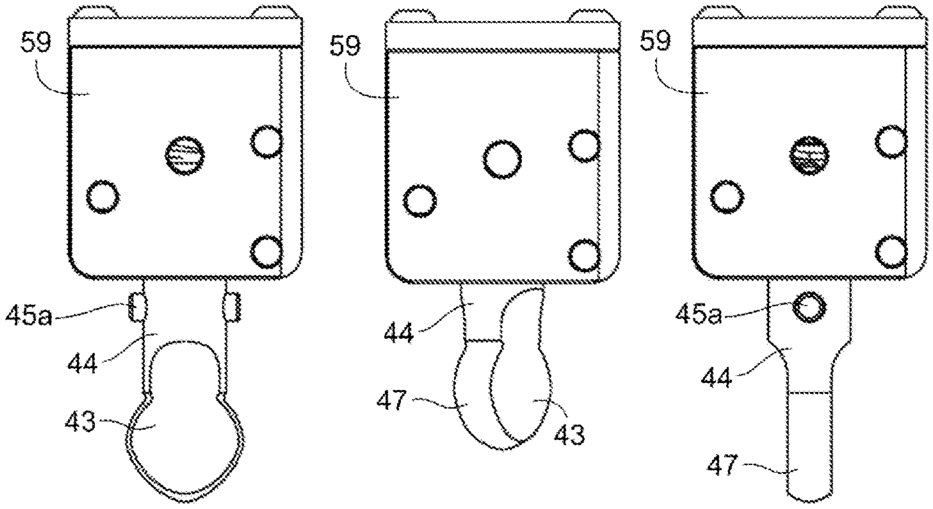
FIG. 9C depicts a rear view of FIG. 9A.
Figure 10:
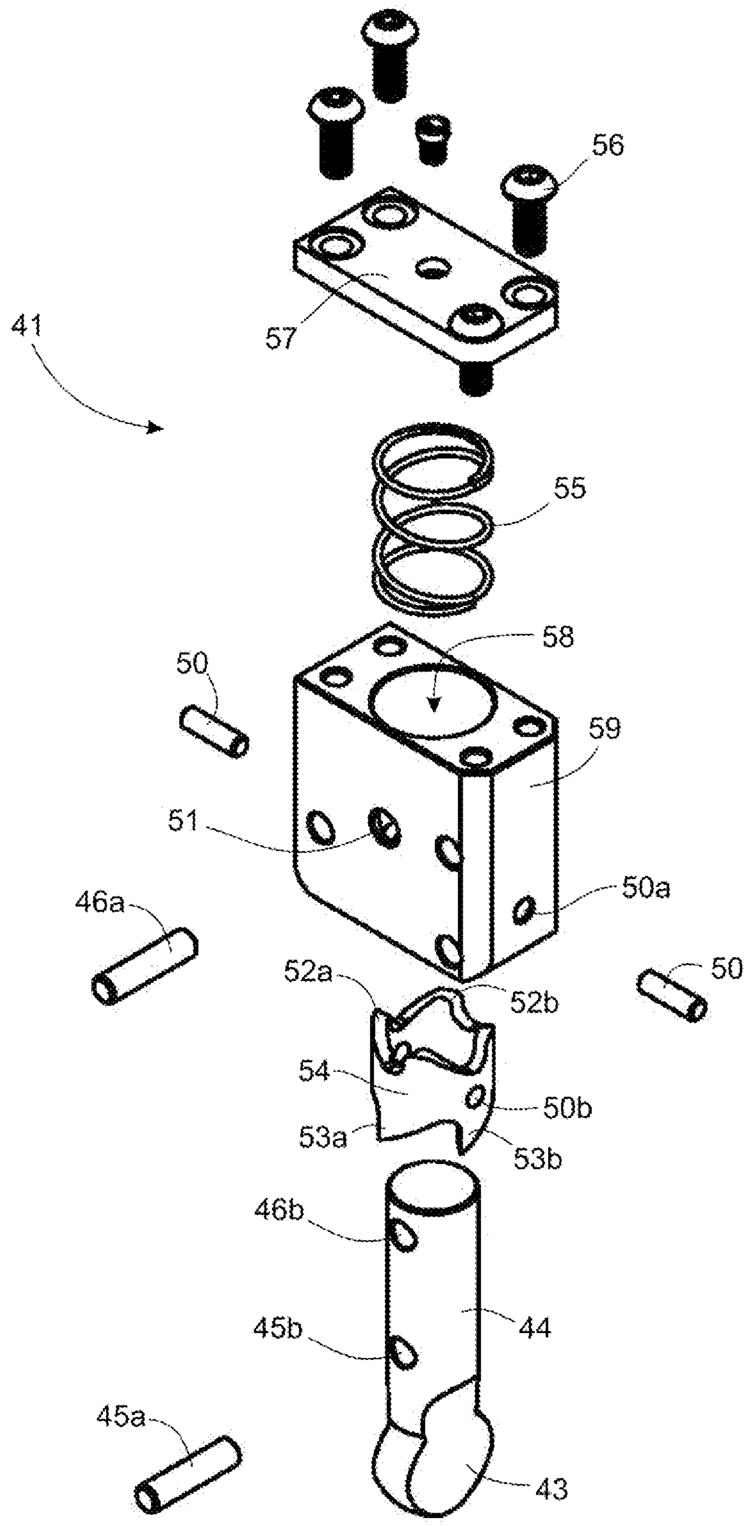
FIG. 10 depicts an exploded view of the clutch shown in FIG. 9A.

Each of FIG. 9A, FIG. 9B and FIG. 9C illustrate the first locking clutch 41 as it undergoes a cycle from the locking position to the unlocking position, with a front face of the housing 59 removed to visualize an interior of the first locking clutch 41. Starting with the left image, the first locking clutch 41 is in the locking position with the face of the locking disc 43 oriented parallel to the long face of the housing 59 and the clutch stem 44 extended under bias from the compression spring 55. The second cam stop 46*a* is engaged with a first pair 52*a* of the second cams preventing rotation of the clutch stem 44, Further, the second cam stop 46*a* is also engaged with the compression spring 55, the compression spring 55 biasing the clutch stem 44 through the second cam stop 46*a*. The first cam stop 45*a* is below the cam body 54. As the first locking clutch 41 is forced against the boundary surface of the first locking aperture, the clutch stem 44 is forced further into the housing 59 against the bias of the compression spring 55. As a result, the second cam stop 46*a* is raised higher than the first pair 52*a* of second cams thereby permitting rotation of the clutch stem 44. In addition, the first cam stop 45*a* engages sloping edge surfaces 66 at the distal end of the cam body 54 (i.e., two sloping edge surfaces diametrically opposed across the cam body 54) upon which the first cam stop 45*a* rides thereby causing the clutch stem 44 to rotate through an angle until the rotation is stopped by the first cam stop 45*a* engaging a first pair 53*a* of first cams, as seen in the middle image. Lifting the first locking clutch 41 then causes the compression spring 55 to urge the clutch stem 44 to extend thereby forcing the first cam stop 45*a* below the first pair 53*a* of first cams. Extension of the clutch stem 44 also causes the second cam stop 46*a* to engage sloping edge surfaces 69 at the proximal end of the cam body 54 (i.e. two sloping edge surfaces diametrically opposed across the cam body 54) upon which the second cam stop 46*a* rides because the second cam stop 46*a* is no longer in engagement with any cam stops, thereby causing the clutch stem 44 to further rotate through an angle until the rotation is stopped by the second cam stop 46*a* engaging the second pair 52*b* of second cams, as seen in the right image. The first cam stop 45*a* is now once again below the cam body 54. Between the left image and the right image, the clutch stem 44 has thereby rotated through 90° from the locking position to the unlocking position.

Cycling from the unlocking position to the locking position involves the same actions as both the cam body 54 and the clutch stem 44 are symmetrical with respect to 180° rotations. Thus, starting at the right image with the first locking clutch 41 in the unlocking position, when the first locking clutch 41 is once again lowered to engage the boundary surface of the locking aperture, the clutch stem 44 is forced further into the housing 58 against the bias of the compression spring 55. As a result, the second cam stop 46*a* is raised higher than the second pair 52*b* of second cams thereby permitting rotation of the clutch stem 44. In addition, the first cam stop 45*a* engages sloping edge surfaces 67 at the distal end of the cam body 54 upon which the first cam stop 45*a* rides thereby causing the clutch stem 44 to rotate through an angle until the rotation is stopped again by the first cam stop 45*a* engaging the second pair 53*b* of first cams. Lifting the first locking clutch 41 then causes the compression spring 55 to urge the clutch stem 44 to extend thereby forcing the first cam stop 45*a* below the second pair 53*b* of first cams, which permits completion of the rotation of the clutch stem 44 back to the locking position.

Figure 11:
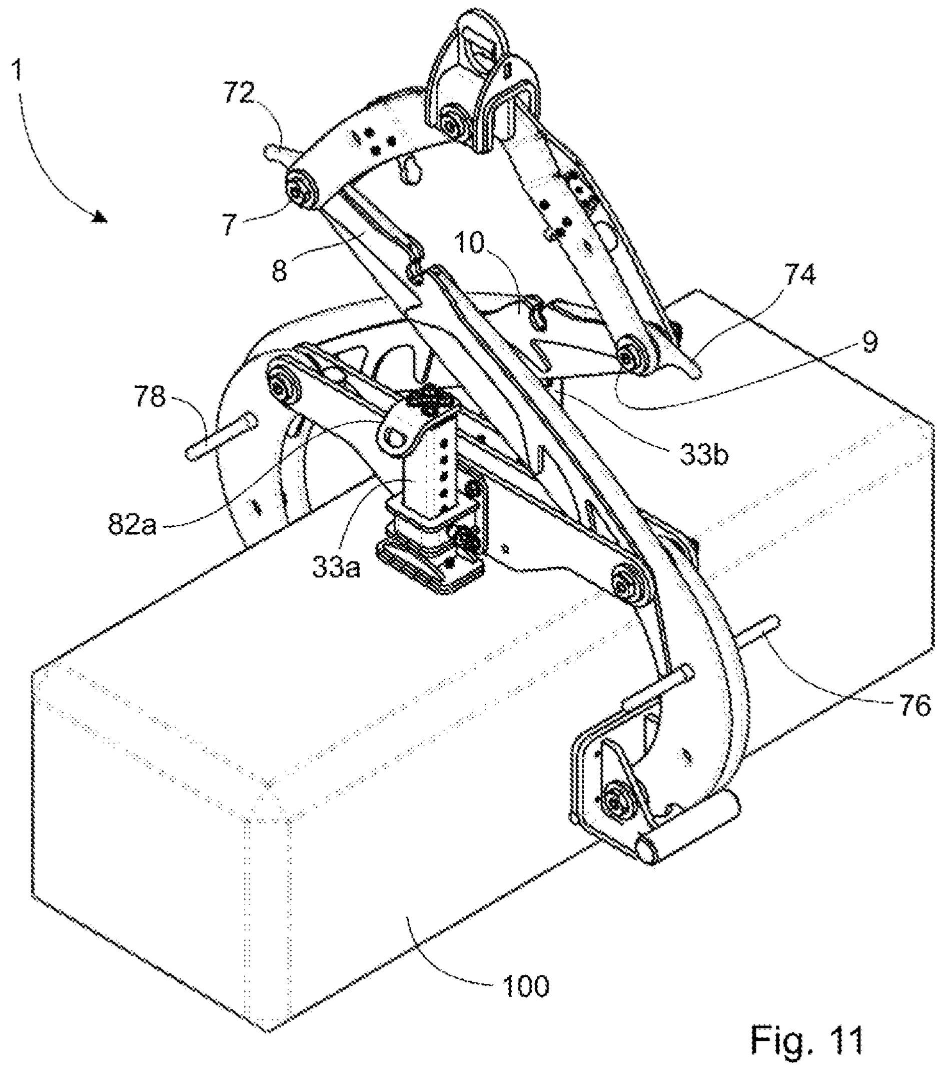
FIG. 11 depicts a variant of the lifting clamp of FIG. 1A.
Figure 12:
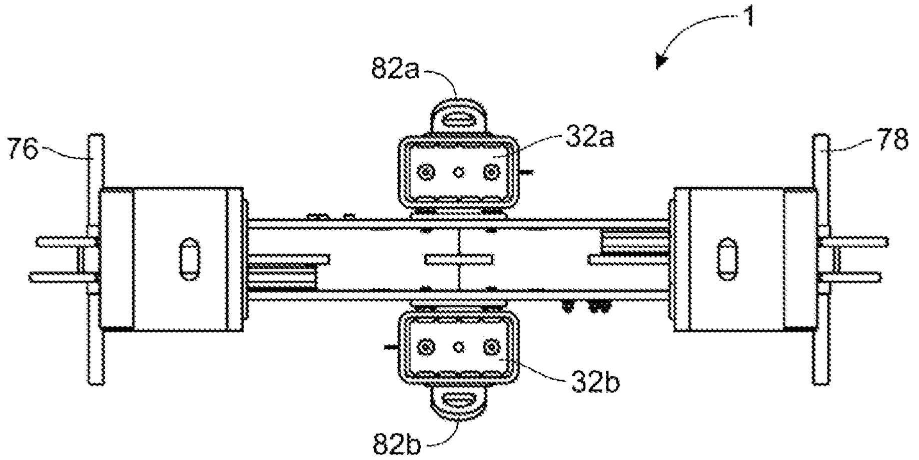
FIG. 12 depicts the variant of FIG. 11 without an object between grippers of the lifting clamp.

FIG. 11 and FIG. 12 depict a variant of the lifting clamp 1 having all of the features mentioned above and some additional features for convenience of use. The additional features include first and second service handles 72, 74, respectively, first and second operator's handles 76, 78, respectively, and first and second tie downs 82*a*, 82*b*, respectively.

The first and second service handles 72, 74 are formed as extensions of the first and second scissor arms 8, 10, respectively, the first and second service handles 72, 74 extending beyond the first and second arm connection pins 7, 9, respectively to permit gripping of the service handles 72, 74 by an operator. The first and second operator handles 76, 78 are pins inserted through accessory apertures 21*b*, 22*b*, respectively, to permit gripping of the operator handles 76, 78 by an operator. The operator handles 76, 78 are useful for permitting the operator to maneuver the clamp 1 in order to position and/or land the object 100. The service handles 72, 74 and the operator handles 76, 78 are also useful for synchronizing the locking clutches 41, 42 when the locking clutches 41, 42 become unsynchronized. Some common causes of losing synchronization are: one or more of the grippers 12, 14 contacted the ground; uneven lowering and resting of the lifting clamp 1; the lifting clamp 1 was not lowered to complete resting position; one or more of the clutches 41, 42 is damaged; and, erratic or jerky control of the lifting clamp movement, not allowing the clutches 41, 42 to move through full motion. Provided there is no damage to one or more of the clutches 41, 42, the service handles 72, 74 and the operator handles 76, 78 may be used to effect synchronization as follows.

Starting with the lifting clamp 1 at the lowest resting position with the grippers 12, 14 on flat, smooth and stable ground or with the outriggers 31, 32 on flat stable ground, the operator stabilizes the lifting clamp 1 with one hand on one the operator handles 76, 78. With the other hand, the operator slightly lifts up on the service handle 76 or 78 on the same side as the operator handle being gripped while monitoring the locking clutch 41 or 42 on the opposing side to observe when the clutch 41 or 42 on the opposing side has completed a half cycle. Then, the operator lowers the lifting clamp 1 using the service handle 72 or 74 that the operator has been gripping, and checks that both clutches 41 or 42 are now in the same orientation. The operation may be repeated, if necessary, and can be performed from either side of the lifting clamp 1.

The tie downs 82*a*, 82*b* are plates with eye holes fixedly connected, for example by welding or with bolts, to the first and second outriggers 31*a*, 31*b*, respectively, proximate the top of the elongated elements 33*a*, 33*b*, respectively. The tie downs 82*a*, 82*b* can be used to secure the lifting clamp 1 for transport.

Figure 13:
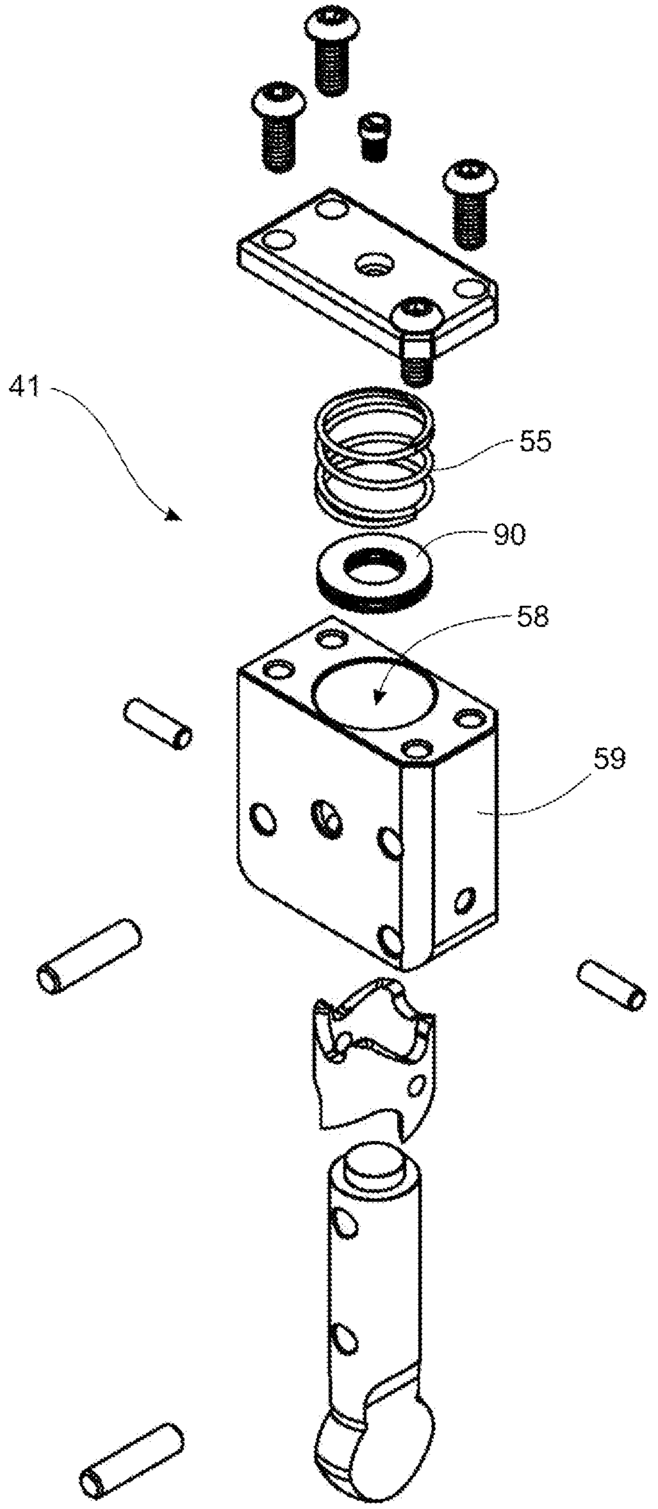
FIG. 13 depicts a variant of the clutch of FIG. 10.

With reference to FIG. 13, a variant of the clutch 41 is shown in which the components are as described above except that a needle bearing 90 is inserted in the bore 58 of the housing 59 below the compression spring 55 so that the compression spring 55 is seated in the bore 58 on the needle bearing 90. Such an arrangement further helps prevent the compression spring 55 from binding.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A lifting clamp comprising:

a lifting lug connectable to a lifting machine;

a first hoisting arm pivotally connected to and extending away from the lifting lug on a first side of a central plane through the lifting lug, and a second hoisting arm pivotally connected to and extending away from the lifting lug on a second side of the central plane such that the central plane is between the first and second hoisting arms;

a first scissor arm pivotally connected to the first hoisting arm, the first scissor arm extending away from the first hoisting arm to cross through the central plane to the second side of the central plane, and a second scissor arm pivotally connected to the second hoisting arm, the second scissor arm extending away from the second hoisting arm to cross through the central plane to the first side of the central plane;

a cross-brace pivotally connected to the first scissor arm on the second side of the central plane and pivotally connected to the second scissor arm on the first side of the central plane;

a first gripper connected to the first scissor arm, and a second gripper connected to the second scissor arm;

at least two locking clutches and at least two corresponding clutch receivers, the clutch receivers configured to receive the locking clutches and the locking clutches configured to be lockable in the clutch receivers for preventing pivoting of the first and second hoisting arms and the first and second scissor arms when the first and second grippers are in an opened configuration; and, at least one outrigger mounted on the cross-brace, the at least one outrigger oriented to engage a top of an object to be clamped between the first and second grippers, the at least one outrigger comprising a shoe for engagement with the top of the object, an elongated element extending from the shoe, a mounting plate mounted on the cross-brace, the mounting element comprising an aperture for receiving the elongated element and a releasable and securable securement element for securing the elongated element in the aperture of the mounting plate and for permitting the elongated element with the shoe to be adjustable vertically in relation to the cross-brace, wherein lifting the lifting lug causes the first and second hoisting arms to pivot toward each other and toward the central plane, the first and second scissor arms to pivot toward each other and toward the central plane and the first and second grippers to pivot toward each other and toward the central plane to clamp the object disposed between the first and second grippers.

2. The lifting clamp of claim 1, wherein the at least one outrigger comprises a first outrigger and a second outrigger, the first outrigger mounted on a first outward face of the cross-brace and the second outrigger mounted on a second outward face of the cross-brace opposite the first outrigger.

3. The lifting clamp of claim 1, wherein the first and second scissor arms each comprise arcuate arm plates, and the first and second grippers are connected to the first and second scissor arms, respectively, at positions on the first and second scissor arms: which are closer to the central plane than the positions at which the cross-brace is connected to the first and second scissor arms when the lifting clamp is in a clamping configuration; and, which are farther from the central plane than the positions at which the cross-brace is connected to the first and second scissor arms when the lifting clamp is in the opened configuration.

4. The lifting clamp of claim 1, wherein the first and second grippers have first and second gripping faces, respectively, for engagement with the object, the first and second grippers are pivotally connected to the first and second scissor arms, respectively, and the first and second grippers are counterweighted to automatically vertically orient, under influence of gravity, the first and second gripping faces when the first and second gripping faces are not engaged with the object.

5. The lifting clamp of claim 1, wherein the at least two locking clutches comprises two locking clutches, the two locking clutches comprising: a first locking clutch mounted on the first hoisting arm and oriented toward the first scissor arm; and, a second locking clutch mounted on the second hoisting arm and oriented toward the second scissor arm, and the at least two corresponding clutch receivers comprises two clutch receivers, the two clutch receivers comprising: a first clutch receiver situated on the first scissor arm and oriented to receive the first locking clutch when the first hoisting arm and the first scissor arm pivot toward each other; and, a second clutch receiver situated on the second scissor arm and oriented to receive the second locking clutch when the second hoisting arm and the second scissor arm pivot toward each other.

6. The lifting clamp of claim 1, wherein each of the locking clutches comprises a rotatable locking disc and each of the corresponding clutch receivers comprises a clutch receiving aperture complementary to the rotatable locking disc, the clutch receiving aperture having an opening through which the rotatable locking disc can be inserted when the rotatable locking disc is rotated to an unlocking position, the clutch receiving aperture having an inner surface that can engage the rotatable locking disc to prevent the rotatable locking disc from exiting the clutch receiving aperture when the rotatable locking disc is rotated to a locking position within the clutch receiving aperture.

7. The lifting clamp of claim 6, wherein at least one of the locking clutches comprises:

a housing having an internal bore;

a cam body comprising a plurality of cams, the cam body situated in the bore proximate a distal end of the bore;

a mechanical helical compression spring seated in the bore in the housing between a proximal end of the bore and the cam body; and, an elongated clutch stem seated on the spring in the bore such that the spring biases the clutch stem distally in the bore, wherein the clutch stem extends from the spring through the cam body and out of the housing, the clutch stem is rotatable within the bore, the clutch stem comprises the locking disc situated at a distal end thereof whereby the locking disc rotates with rotation of the clutch stem, and the clutch stem comprising a plurality of cam stops that engage the cam body to automatically rotate the clutch stem when the clutch stem is biased distally by the spring and when the clutch stem is biased proximally against the spring by an external force on the clutch stem, wherein the plurality of cam stops engages the plurality of cams during rotation of the clutch stem when the clutch stem is biased distally to stop rotation of the clutch stem at a first rotational position and the plurality of cam stops engages the plurality of cams during rotation of the clutch stem when the clutch stem is biased proximally to stop rotation of the clutch stem at a second rotational position different from the first rotational position thereby automatically switching the at least one locking clutch between the locking and unlocking positions.

8. A lifting clamp comprising:

a lifting lug connectable to a lifting machine;

a first hoisting arm pivotally connected to and extending away from the lifting lug on a first side of a central plane through the lifting lug, and a second hoisting arm pivotally connected to and extending away from the lifting lug on a second side of the central plane such that the central plane is between the first and second hoisting arms;

a first scissor arm pivotally connected to the first hoisting arm, the first scissor arm extending away from the first hoisting arm to cross through the central plane to the second side of the central plane, and a second scissor arm pivotally connected to the second hoisting arm, the second scissor arm extending away from the second hoisting arm to cross through the central plane to the first side of the central plane;

a cross-brace pivotally connected to the first scissor arm on the second side of the central plane and pivotally connected to the second scissor arm on the first side of the central plane;

a first gripper connected to the first scissor arm, and a second gripper connected to the second scissor arm;

at least two locking clutches and at least two corresponding clutch receivers, the clutch receivers configured to receive the locking clutches and the locking clutches configured to be lockable in the clutch receivers for preventing pivoting of the first and second hoisting arms and the first and second scissor arms when the first and second grippers are in an opened configuration; and, at least one outrigger mounted on the cross-brace, the at least one outrigger oriented to engage a top of an object to be clamped between the first and second grippers.

9. The lifting clamp of claim 8, wherein lifting the lifting lug causes the first and second hoisting arms to pivot toward each other and toward the central plane, the first and second scissor arms to pivot toward each other and toward the central plane and the first and second grippers to pivot toward each other and toward the central plane to clamp the object disposed between the first and second grippers.

10. The lifting clamp of claim 8, wherein at least a part of the at least one outrigger is adjustable vertically in relation to the cross-brace.

11. The lifting clamp of claim 8, wherein the at least one outrigger comprises a shoe for engagement with the top of the object, an elongated element extending from the shoe, a mounting plate comprising an aperture for receiving the elongated element and a securement element for securing the elongated element in the aperture of the mounting plate, wherein the mounting plate is mounted on the cross-brace.

12. The lifting clamp of claim 11, wherein the securement element is releasable and securable to permit the elongated element with the shoe to be adjustable vertically in relation to the cross-brace.

13. A locking clutch comprising:

a housing having an internal bore;

a cam body comprising a plurality of cams, the cam body situated in the bore proximate a distal end of the bore;

a mechanical helical compression spring seated in the bore in the housing between a proximal end of the bore and the cam body; and, an elongated clutch stem seated on the spring in the bore such that the spring biases the clutch stem distally in the bore, wherein the clutch stem extends from the spring through the cam body and out of the housing, the clutch stem is rotatable within the bore, the clutch stem comprises a locking disc situated at a distal end thereof whereby the locking disc rotates with rotation of the clutch stem, and the locking disc is configured to be insertable into a corresponding clutch receiver when the locking disc is rotated to an unlocking position and the locking disc is configured to engage with an inner surface of the clutch receiver when the locking disc is rotated to a locking position to prevent the locking disc from exiting the clutch receiver when the locking disc is rotated to the locking position, and the clutch stem comprises a plurality of cam stops that engage the cam body to automatically rotate the clutch stem when the clutch stem is biased distally by the spring and when the clutch stem is biased proximally against the spring by an external force on the clutch stem, wherein the plurality of cam stops engages the plurality of cams during rotation of the clutch stem when the clutch stem is biased distally to stop rotation of the clutch stem at a first rotational position and the plurality of cam stops engages the plurality of cams during rotation of the clutch stem when the clutch stem is biased proximally to stop rotation of the clutch stem at a second rotational position different from the first rotational position thereby automatically switching the locking clutch between the locking and unlocking positions.

* * * * *